United States Patent
Saint Aroman et al.

(10) Patent No.: US 7,415,330 B2
(45) Date of Patent: Aug. 19, 2008

(54) AIRCRAFT STANDBY DISPLAY DEVICE AND SYSTEM

(75) Inventors: Stéphane Saint Aroman, Toulouse (FR); Marielle Plat, Toulouse (FR); Patrice Rouquette, La Loubiere (FR)

(73) Assignee: AIRBUS France, Toulouse (FR)

( * ) Notice: Subject to any disclaimer, the term of this patent is extended or adjusted under 35 U.S.C. 154(b) by 233 days.

(21) Appl. No.: 10/846,660

(22) Filed: May 17, 2004

(65) Prior Publication Data
US 2004/0236481 A1  Nov. 25, 2004

(30) Foreign Application Priority Data
May 19, 2003 (FR) .................................. 03 05951

(51) Int. Cl.
*G06F 19/00* (2006.01)
(52) U.S. Cl. .................. 701/14; 701/3; 701/4; 244/1 R; 244/75.1
(58) Field of Classification Search .................. None
See application file for complete search history.

(56) References Cited

U.S. PATENT DOCUMENTS

| | | | |
|---|---|---|---|
| 4,598,292 A | 7/1986 | Devino | |
| 5,195,040 A * | 3/1993 | Goldsmith | 701/200 |
| 5,978,715 A | 11/1999 | Briffe et al. | |
| 6,038,498 A * | 3/2000 | Briffe et al. | 701/3 |
| 6,112,141 A * | 8/2000 | Briffe et al. | 701/14 |
| 6,314,343 B1 * | 11/2001 | Adams et al. | 701/3 |
| 6,564,628 B1 | 5/2003 | Leblond et al. | |
| 6,691,030 B2 * | 2/2004 | Winikka | 701/206 |
| 6,832,138 B1 * | 12/2004 | Straub et al. | 701/3 |
| 6,842,122 B1 * | 1/2005 | Langner et al. | 340/945 |
| 6,842,672 B1 * | 1/2005 | Straub et al. | 701/3 |
| 6,922,631 B1 * | 7/2005 | Dwyer et al. | 701/206 |
| 2003/0030911 A1 | 2/2003 | Brooks | |

FOREIGN PATENT DOCUMENTS

FR 2784457 4/2000

* cited by examiner

*Primary Examiner*—Khoi H. Tran
*Assistant Examiner*—Marie A Weiskopf
(74) *Attorney, Agent, or Firm*—Dickinson Wright, PLLC

(57) ABSTRACT

The device (1) comprises a set (3) of information sources, an information processing unit (4), a display means (6) comprising a display screen (8), and a configuration means (9) allowing an operator to configure said device (1), according to one of the three configuration states, a first configuration state, for which the display means (6) presents aircraft piloting information, a second configuration state, for which the display means (6) presents aircraft navigation information, and a third configuration state, for which the display means (6) presents both piloting information and navigation information.

9 Claims, 1 Drawing Sheet

AIRCRAFT STANDBY DISPLAY DEVICE AND SYSTEM

The present invention relates to a standby display device and system of an aircraft, in particular of a civil transport airplane.

Such a standby display device must be used to compute and display on the aircraft flight deck minimal information (speed, altitude, attitude, navigation information, etc.) which is representative of the flight of the aircraft, in the event of failure of a main display device of the aircraft, in particular a navigation screen of the "ND" (Navigation Display) type or a primary piloting screen of the "PFD" (Primary Flight Display) type, or, in the event of a failure of a system [ADIRS (Air Data and Inertial Reference System), FMS (Flight Management System), etc.] generating information usually displayed on said main display devices of the aircraft (ND, PFD, etc).

A first standby display device of the "ISIS" (Integrated Standby Instrument System) type is known which displays information of altitude, speed and attitude of the aircraft on a screen, the man/machine interface of which resembles that of the PFD screen. Document FR-2 784 457 relates to such a first standby display device.

Also known is a second standby display device of the "DDRMI" (Digital Distance and Radio Magnetic Indicator) type which displays navigation information such as the heading of the aircraft, and its position relative to customary beacons, for example of the "VOR" (VHF Omnidirectional Range) or "DME" (Distance Measuring Equipment) type.

These two standby display devices, ISIS and DDRMI, therefore display very different information.

However, even when an aircraft simultaneously has these two devices, ISIS and DDRMI, major drawbacks still exist in the standby display. Specifically, when the ISIS device has failed or is not available, the aircraft cannot take off for safety reasons, since certain information would then not be guaranteed to be displayed in the event of failure of the main display devices (PDF, ND, etc.) during the flight.

Furthermore, the operation of the DDRMI device is based on the receipt of information from VOR, DME, etc. beacons. Now, such beacons do not exist in desert or ocean regions and, in such situations, the DDRMI device can display only the heading, but not the position of the aircraft relative to these beacons, because the latter do not exist in the regions in question. Furthermore, these beacons are based on relatively old technologies and, in the medium term, are at risk of ceasing to be installed on the ground in the countries likely to be overflown by the aircraft.

The subject of the present invention is a standby display device which allows the above-mentioned drawbacks to be remedied.

As a result, according to the invention, said standby display device comprising:
- a set of information sources;
- an information processing unit capable of processing information originating from said set of information sources; and
- a display means capable of presenting on at least one display screen processed information originating from said information processing unit, is remarkable in that it also comprises a configuration means by which an operator can configure said standby display device, according to one of the following three configuration states:

- a first configuration state, for which said display means presents aircraft piloting information on the display screen;
- a second configuration state, for which said display means presents navigation information of the aircraft on the display screen; and
- a third configuration state, for which said display means presents both piloting information and navigation information on the display screen.

Thus, thanks to the invention, said standby display device can compute and display all the essential information that is representative of the flight of an aircraft, that is to say both said piloting information (speed, altitude, attitude, etc.) and said navigation information. In addition, this piloting and navigation information can be displayed:
- either separately (first and second configuration states), the standby display device according to the invention then being able to deputize for at least one faulty navigation screen or at least one faulty piloting screen;
- or simultaneously (third configuration state), the standby display device according to the invention then being able to deputize simultaneously for at least one navigation screen and/or at least one piloting screen, plus a second standby display device according to the invention, which are all faulty.

The standby display device according to the invention may therefore effectively replace said customary ISIS and DDRMI devices and thus remedy the above-mentioned drawbacks.

In addition, advantageously, said set of information sources comprises sources which are installed on the aircraft and which supply position indications, and the position indications supplied by these sources are part of said navigation information. Thus, the standby display device according to the invention is not dependent upon, in particular, beacons situated on the ground.

Furthermore, advantageously, when said standby display device is configured in one of said second and third configuration states for presenting navigation information:
- said information processing unit determines the theoretical flight path the aircraft should follow, and the deviation between the effective position of the aircraft and said theoretical flight path; and.
- said display means presents said theoretical flight path and said deviation on said display screen.

This has the advantage, relative to a DDRMI device for example, of a uniformity of display with the ND screen (which the standby display device according to the invention replaces in the event of failure of said ND screen) and therefore of a user friendliness appropriate to this type of emergency situation.

Furthermore, advantageously, the standby display device according to the invention also comprises an input means allowing an operator to enter data in said standby display device and, when said standby display device is configured in one of said second and third configuration states allowing presentation of navigation information:
- said input means is used (by the pilot, for example) to enter flight path waypoints; and
- said display means presents on said display screen the flight path waypoints thus entered.

In addition, advantageously, said set of information sources comprises a device capable of supplying information on the horizontal position of the aircraft, and, when said standby display device is configured in one of said second and third configuration states for presenting navigation information, said display means presents said horizontal position of the aircraft on said display screen.

Furthermore, in a particular embodiment, when said standby display device is configured in one of said second and third configuration states for presenting navigation information:

said information processing unit determines an indication of direction toward a predetermined geographic waypoint in latitude and in longitude; and said display means presents said direction indication on said display screen.

Such a display can be used to simulate a VOR reading and, in consequence, retain a functionality that certain pilots are used to using on a DDRMI device.

The present invention also relates to an aircraft standby display system.

According to the invention, said standby display system is remarkable in that it comprises at least two standby display devices of the aforementioned type. Preferably, said two standby display devices are identical in all respects.

The use on the flight deck of said two standby display devices, for example a first programmed to display piloting information relating to the speed, altitude and attitude of the aircraft (like an ISIS device for example) and a second to display navigation information (like a DDRMI device for example), allows the aircraft to take off even when one of said two standby display devices has failed, because the pilot can then reconfigure the one of the two standby display devices that has not failed in order to gain access to all the information concerning the flight of that aircraft: combined display of both types of information (third configuration state). This results in a reduction in aircraft operating costs. It also results in improved flight safety and improved availability of the aircraft since, in the event of failure in flight of one of said two standby display devices, all its functionalities are available on the other standby display device, whereas with the aforementioned customary devices, in the event of a failure of the ISIS device or of the DDRMI device for example, the functionalities corresponding to the failed device are lost.

Another advantage of the standby display system according to the invention resides in the fact that, despite the redundancy functionalities that they afford, the two standby display devices occupy substantially similar space on the flight deck to the space taken up by the customary devices that they replace, for example the ISIS and DDRMI devices. In addition, the fact that said two standby display devices are identical reduces the number of replacement parts.

Furthermore, in a particular embodiment, the two sets of information sources of said two standby display devices are part of one and the same information unit and the two information processing units of said two standby display devices are part of one and the same central unit.

The present invention also relates to an aircraft display system, which comprises at least one main display device, for example an ND or PFD type device.

According to the invention, said display system is remarkable in that it also comprises a standby display system such as the aforementioned.

In a preferred embodiment, said main display device (ND or PFD for example) comprises information sources and said two sets of information sources of said two standby display devices (of said standby display system) are distinct from said information sources of said main display device. This increases the reliability of operation of said display system.

The figures in the appended drawing will clearly explain how the invention can be implemented. In these figures, the same reference numbers denote similar elements.

Figure 1:
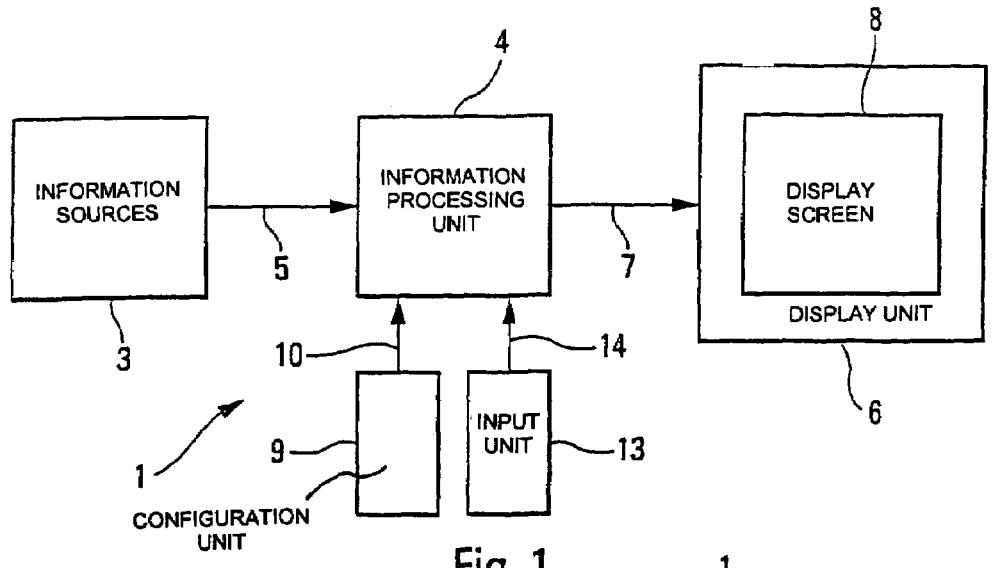
FIG. 1 is the block diagram of a standby display device according to the invention.

The device 1 according to the invention is a standby display device of an aircraft, in particular of a civil transport airplane, is intended to deputize for a customary main display device, in particular a PFD device or an ND device, in the event of a failure of the latter. Accordingly, said device 1 may form part of a standby display system 2 shown in FIG. 2 and specified below.

Said standby display device 1, which is onboard the aircraft, is of the type comprising:

a set 3 of information sources;

an information processing unit 4 which is connected via a link 5 to said set 3 of information sources and which is capable of processing information originating from said set 3 of information sources; and a display means 6 which is connected via a link 7 to said information processing unit 4 and which is capable of presenting, on at least one customary display screen 8, processed information originating from said information processing unit 4.

According to the invention, said device 1 also comprises a configuration means 9 by which an operator (particularly a pilot of the aircraft) can configure said standby display device 1, according to one of the following three (display) configuration states:

a first configuration state, for which said display means 6 presents customary piloting information on the display screen 8, relating in particular to the speed, altitude and attitude of the aircraft;

a second configuration state, for which said display means 6 presents customary navigation information of the aircraft on the display screen 8; and a third configuration state, for which said display means 6 presents both piloting information and navigation information on the display screen 8.

Thus, thanks to the invention, said standby display device 1 can compute and display all the information essential to the flight of the aircraft, that is to say both piloting information (speed, altitude, attitude, etc.) and navigation information. In addition, said piloting and navigation information may be displayed either separately (first or second configuration state) or simultaneously (third configuration state).

The standby display device 1 according to the invention may therefore effectively replace aforementioned customary devices ISIS and DDRMI.

Preferably, said configuration means 9 corresponds to an actuation means, for example a button, on which an action of the pilot is used to switch from one display to another, that is to say from one configuration state to another.

Figure 2:
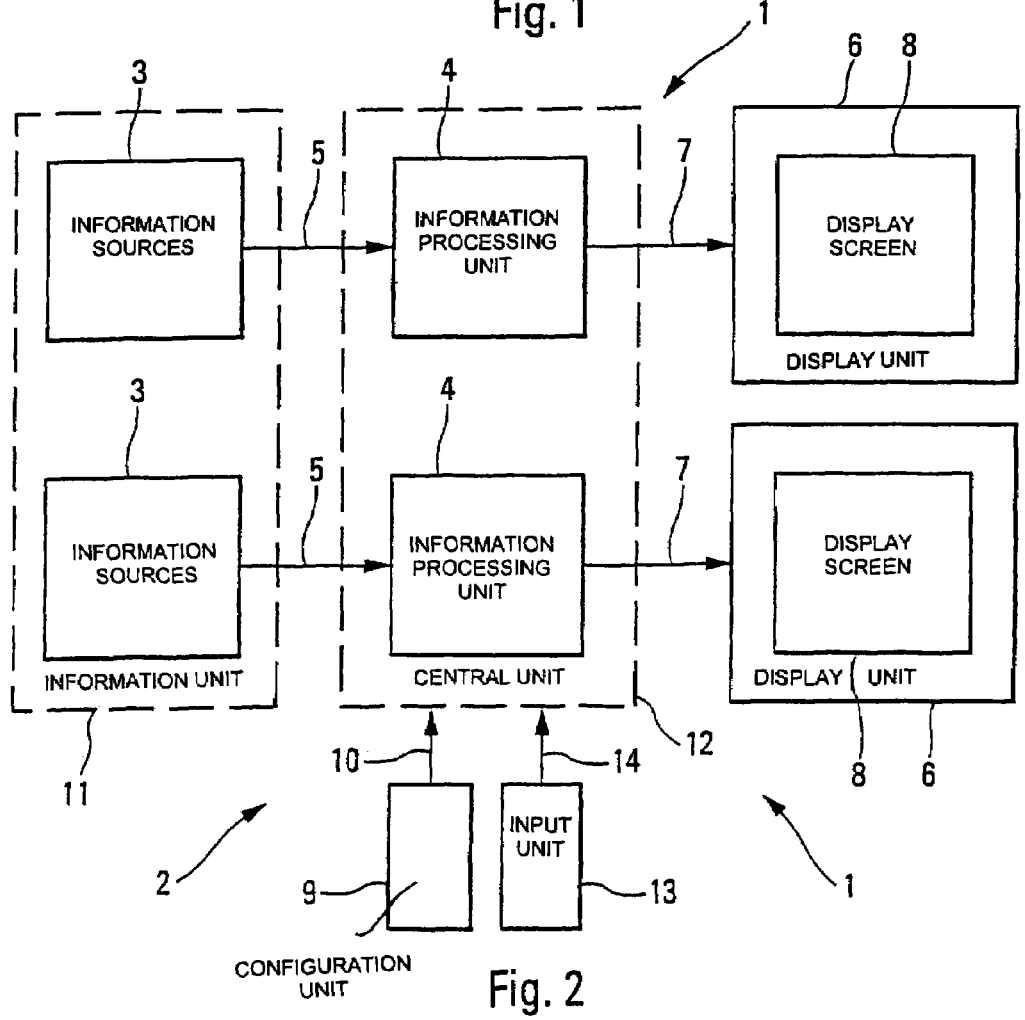
FIG. 2 is the block diagram of a standby display system according to the invention.

According to the invention, as shown in FIG. 2, said standby display system 2 comprises two standby display devices 1 of the aforementioned type. Preferably, said two standby display devices 1 are identical in all respects.

The use on the flight deck of said two devices 1, a first of which is for example programmed to display piloting information relating in particular to the speed, altitude and attitude of the aircraft (like an ISIS device), and the second of which is programmed to display navigation information (like a DDRMI device), allows the aircraft to take off even when one of said two devices 1 has failed, because the pilot can then reconfigure the one of the two devices 1 that has not failed in order to gain access to all the information concerning the flight of that aircraft: combined display of both types of information (third configuration state). This results in a reduction in the costs of operating the aircraft by the company. It also results in improved flight safety and improved availability of the aircraft, since, in the event of failure in flight of one of said two devices 1, all its functionalities are available on the other, whereas with the aforementioned customary ISIS and DDRMI devices, in the event of a failure of the ISIS device or of the DDRMI device, the functionalities corresponding to the failed device are lost.

Another advantage of the invention lies in the fact that, despite the redundancy functionalities that they afford, these two standby display devices 1 occupy substantially similar space on the flight deck to the space taken up by the customary devices that they replace, for example the ISIS and DDRMI devices.

In addition, the fact that said two standby display devices 1 are identical reduces the number of replacement parts.

In the particular embodiment shown in FIG. 2, the two sets 3 of information sources of said two devices 1 are part of a single information unit 11 and the two information processing units 4 of said two devices 1 are part of a single central unit 12.

In a particular embodiment, said set 3 of information sources comprises customary sources (for example IRS, GPIRS, GPS, etc.) which are installed on the aircraft and which supply position indications, the position indications supplied by these sources forming part of said navigation information. Thus, the display of the navigation information is based on information supplied by internal position indication sources already existing on the aircraft (for example IRS, GPIRS, GPS), rather than on information originating from external beacons (VOR, DME, etc.). This is advantageous because the device 1 according to the invention can then display position indications of the aircraft, even if it is overflying regions not provided with such external beacons.

Furthermore, advantageously, when said device 1 is configured in one of said second and third configuration states for presenting navigation information:

said information processing unit 4 determines the theoretical flight path the aircraft should follow, and the deviation between the effective position of the aircraft and said theoretical flight path; and said display means 6 presents said theoretical flight path and said deviation on said display screen 8.

This has the advantage, unlike the DDRMI device, of a uniformity of display with the ND screen (which the standby display device 1 according to the invention replaces in the event of failure of said ND screen) and therefore of a user friendliness appropriate to this type of emergency situation.

Specifically, the purpose of the standby display system 2 according to the invention is to deputize for the usual flight instruments which become unavailable. It is known that the customary standby instruments (excluding the ISIS device) are set apart from the representation of information dispensed on primary screens (ND screen for example) and, as a result, require the pilots to adapt, usually during flight situations that are stressful. Since, furthermore, it is known that training in manual flight situations with use of standby instruments is less and less frequent during in-service training of pilots, when the latter are confronted with such a situation in reality, they then have to use instruments to which they are not accustomed and their workload increases considerably, as well as their stress. Since the new interface according to the invention (device 1 or system 2) resembles the interfaces already used for the main instruments, it helps navigation in particular by reflecting the general principles essential to the management of navigation and by presenting the pilot with a representation similar to that which he would have to reconstruct mentally.

This interface therefore lightens the workload in a crisis situation and provides better control of the situation for pilots.

In a particular embodiment, the standby display device 1 also comprises an input means 13 which is connected via a link 14 to the unit 4 and which allows an operator (a pilot of the aircraft for example) to enter data in said standby display device 1 and, when said device 1 is configured in one of said second and third configuration states allowing presentation of navigation information:

said input means 13 is used by the operator to enter a (limited) number of flight path waypoints on a flight plan; and said display means 6 presents on said display screen 8 the flight path waypoints thus entered.

As an example, the (limited) number of flight path waypoints may be equal to 10. This number is assessed to be sufficient to enter the turning flight path waypoints contained in an average approach, without having to operate the interface again. This therefore has the advantage of not needlessly increasing the workload of the pilot in a flight phase in which this workload is already high. This functionality which is new relative to a DDRMI device is used to make up for a failure of a flight management system, whether it be on the display or the availability of data, while supplying an intuitive display of the horizontal guidance information.

In a preferred embodiment corresponding to the case in which the standby display device 1 is configured in the second configuration state (navigation information display), when, during the flight of the aircraft, it passes close to a flight path waypoint in the flight plan, said standby display device 1 automatically (without a request from the pilot) modifies its display so that said display means 6 presents on said display screen 8 information relating to the segment of said flight plan between said flight path waypoint in the vicinity of which the aircraft is passing and the next flight path waypoint on that flight plan in the vicinity of which the aircraft intends to pass. This embodiment is advantageous in that it allows an intuitive display of horizontal guidance information and an automatic scrolling of the segments of the flight plan as the aircraft flies along.

In a particular embodiment, said set 3 of information sources comprises a device capable of supplying information on the horizontal position (for example latitude/longitude) of the aircraft [for example a satellite positioning device GPS (Global Positioning System), an IRS (Inertial Reference System) device, a GPIRS (Global Positioning/Inertial Reference System) device, etc.], and, when said device 1 is configured in one of said second and third configuration states for presenting navigation information, said display means 6 presents said horizontal position of the aircraft on said display screen 8.

When the various aforementioned embodiments of the invention are combined, the standby display system 2 can be used to make up for the failures of primary display devices (PFD, ND) and flight management devices (FMS), and even for the failures of ADIRS (Air Data Inertial Reference System) devices since, in the latter case, the system 2 can be used to display the horizontal position (for example latitude/longitude) of the aircraft based on information supplied by a device capable of supplying horizontal position information (GPS device, etc.), as indicated above. This system 2 therefore allows the pilot to bring the aircraft to its destination, in the cases in question, with an operating mode most closely resembling that corresponding to the normal operation of the primary display devices, which improves the user friendliness of the flight deck in respect of being better suited to crisis situations.

Furthermore, in a particular embodiment, when said standby display device 1 is configured in one of said second and third configuration states for presenting navigation information:

said information processing unit 4 determines an indication of direction toward a predetermined geographic waypoint in latitude and in longitude; and said display means 6 presents said direction indication on said display screen 8.

Such a display can be used to simulate a VOR reading and, in consequence, to retain a functionality that certain pilots are used to using on a DDRMI device.

The present invention also relates to a display system (not shown) of an aircraft which comprises at least one customary main display device, for example a device of the ND or PFD type.

According to the invention, said display system is remarkable in that it also comprises a standby display system 2 like the one described above.

In a preferred embodiment, said main display device comprises information sources, and said two sets 3 of information sources of said two standby display devices 1 (of said standby display system 2) are distinct from said information sources of said main display device. This increases the reliability of operation of said display system according to the invention.

The invention claimed is:

1. An aircraft display system comprising:
two standby display devices that each comprise:
a set of information sources;
an information processing unit capable of processing information originating from said set of information sources;
a display unit operable to present on at least one display screen processed information originating from said information processing unit; and
a configuration section by which an operator can configure said display unit to display:
a first configuration state, for which said display unit presents, solely, customary piloting information on the display screen, relating to the speed, altitude, and attitude of the aircraft;
a second configuration state, for which said display unit presents, solely, customary navigation information of the aircraft on the display screen; and
a third configuration state, for which said display unit presents both the piloting information and the navigation information on the display screen,
wherein:
the configuration section is an actuation section that can be switched by a pilot so as to switch the display on the display screen from each one of the first through third configuration states to another; and
two main display devices corresponding to one navigation display and one primary flight display, each main display device comprising an information source, wherein:
the two sets of information sources of said standby display devices are part of one and the same information unit,
the two information processing units of said two standby display devices are part of one and the same central unit,
the two display units are separate units; and
said two sets of information sources of said two standby display devices are distinct from said information sources of said two main display devices.

2. The aircraft display system of claim 1, wherein:
when no failure occurs in the two main and two standby display devices, one main and one standby display device are each programmed to display piloting information and the other main and standby display device are each programmed to display navigation information,
when a failure occurs in one of the two standby display devices, the other standby display device is configured for the third configuration state so as to present both piloting information and navigation information, and
when a failure occurs in one of the two main display devices, the configurations of the standby display devices are not modified.

3. The aircraft display system of claim 1, wherein each said set of information sources comprises sources which are installed on the aircraft and which supply position indications, and wherein the position indications supplied by these sources are part of said navigation information.

4. The aircraft display system of claim 1, wherein when one of said standby display devices is configured in one of said second and third configuration states for presenting navigation information:
said corresponding information processing unit determines a theoretical flight path the aircraft should follow, and the deviation between the effective position of the aircraft and said theoretical flight path; and
said corresponding display unit presents said theoretical flight path and said deviation on said display screen.

5. The aircraft display system of claim 1, further comprising:
an input unit allowing an operator to enter data in one of said standby display devices, wherein
when said one standby display device is configured in one of said second and third configuration states allowing presentation of navigation information:
said input unit is used to enter flight path waypoints; and
said corresponding display unit presents on said display screen the flight path waypoints thus entered.

6. The aircraft display system of claim 1, wherein:
each said set of information sources comprises a device operable to supply information on the horizontal position of the aircraft, and
when one of said standby display devices is configured in one of said second and third configuration states for presenting navigation information, said corresponding display unit presents said horizontal position of the aircraft on said display screen.

7. The aircraft display system of claim 1, wherein when one of said standby display devices is configured in one of said second and third configuration states for presenting navigation information:
said corresponding information processing unit determines an indication of direction in latitude and longitude toward a predetermined geographic waypoint that is a point where a very high frequency (VHF) omnidirectional range (VOR) beacon is mounted; and
said corresponding display unit presents said direction indication on said display screen.

8. The aircraft display system of claim 1, wherein said two standby display devices are identical.

9. The aircraft display system of claim 1, wherein when one of said standby display devices is configured in the second configuration state and the aircraft passes close to a flight path waypoint in the flight plan, the corresponding display unit presents on the display screen information relating to the segment of the flight plan between the flight path waypoint in the vicinity of the aircraft and the next flight path waypoint.

* * * * *